(12) United States Patent
Liu et al.

(10) Patent No.: US 11,169,413 B2
(45) Date of Patent: Nov. 9, 2021

(54) DISPLAY APPARATUS

(71) Applicants: Hefei Xinsheng Optoelectronics Technology Co., Ltd., Anhui (CN); BOE Technology Group Co., Ltd., Beijing (CN)

(72) Inventors: Jiaqing Liu, Beijing (CN); Yanping Liao, Beijing (CN); Ke Dai, Beijing (CN); Lei Guo, Beijing (CN)

(73) Assignees: Hefei Xinsheng Optoelectronics Technology Co., Ltd., Hefei (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/921,960

(22) Filed: Jul. 7, 2020

(65) Prior Publication Data
US 2021/0063813 A1    Mar. 4, 2021

(30) Foreign Application Priority Data
Aug. 29, 2019    (CN) .......................... 201910806956.3

(51) Int. Cl.
G02F 1/1335    (2006.01)
G02F 1/1362    (2006.01)

(52) U.S. Cl.
CPC .. G02F 1/133528 (2013.01); G02F 1/136286 (2013.01)

(58) Field of Classification Search
CPC ......... G02F 1/133528; G02F 1/133531; G02F 1/136286; G02F 1/1368; G02F 1/133601; G02F 1/1347; G02B 5/30; F21V 9/14; F21V 14/003; G09G 2300/0246; H01L 27/124
See application file for complete search history.

(56) References Cited

U.S. PATENT DOCUMENTS

| 2011/0075070 A1* | 3/2011 | Kitagawa | G02F 1/133504 349/64 |
| 2019/0072701 A1* | 3/2019 | Murashige | H01L 51/5281 |
| 2020/0326587 A1* | 10/2020 | Heo | G02F 1/133528 |

* cited by examiner

*Primary Examiner* — Angela K Davison
(74) *Attorney, Agent, or Firm* — Ling Wu; Stephen Yang; Ling and Yang Intellectual Property

(57) ABSTRACT

A display apparatus includes a first polarizer, a first liquid crystal panel, a second polarizer, a second liquid crystal panel and a third polarizer which are sequentially stacked, wherein the second polarizer includes two protective layers, and a polarizing layer positioned between the two protective layers.

18 Claims, 9 Drawing Sheets

DISPLAY APPARATUS

CROSS-REFERENCE TO RELATED APPLICATION

The present application claims the priority of Chinese Patent Application No. 201910806956.3 filed to the CNIPA on Aug. 29, 2019, the content of which is hereby incorporated by reference.

TECHNICAL FIELD

The present disclosure relates to, but is not limited to, the technical field of display, in particular to a display apparatus.

BACKGROUND

ADS (Advanced Super Dimension Switch) display technology, with its advantages of wide viewing angle and high transmittance, has quickly occupied most of the LCD market, particularly for large-size TV products, and production capacity of ADS has been continuously improved. However, due to limitation of a production process corresponding to the ADS mode, a contrast ratio of an ADS mode display device can only be maintained at a level of about 1200~1800, which greatly limits its application in TV high-end products.

SUMMARY

The following is a summary of the subject matter described in detail in the present disclosure. This summary is not intended to limit the scope of the claims.

The present disclosure provides a display apparatus, including a first polarizer, a first liquid crystal panel, a second polarizer, a second liquid crystal panel and a third polarizer which are sequentially stacked, wherein the second polarizer includes two protective layers, and a polarizing layer positioned between the two protective layers.

In an exemplary embodiment, an in-plane optical path difference compensation value Ro of the protective layer close to the first liquid crystal panel among the two protective layers of the second polarizer is less than 100 nm, and an optical path difference compensation value Rth in a thickness direction is less than 1000 nm.

In an exemplary embodiment, an in-plane optical path difference compensation value Ro of the protective layer close to the first liquid crystal panel among the two protective layers of the second polarizer is less than 50 nm, and an optical path difference compensation value Rth in a thickness direction is less than 500 nm.

In an exemplary embodiment, an in-plane optical path difference compensation value Ro of the protective layer close to the first liquid crystal panel among the two protective layers of the second polarizer is less than 10 nm, and an optical path difference compensation value Rth in a thickness direction is less than 100 nm.

In an exemplary embodiment, in-plane optical path difference compensation values Ro of the two protective layers of the second polarizer are both less than 10 nm, and optical path difference compensation values Rth of the two protective layers in a thickness direction are both less than 100 nm.

In an exemplary embodiment, the first polarizer and the third polarizer both have a same structure as the second polarizer; wherein, an in-plane optical path difference compensation value Ro of the protective layer close to the first liquid crystal panel among the two protective layers of the first polarizer is less than 10 nm, and an optical path difference compensation value Rth in a thickness direction is less than 100 nm; and/or, an in-plane optical path difference compensation value Ro of the protective layer close to the second liquid crystal panel among the two protective layers of the third polarizer is less than 10 nm, and an optical path difference compensation value Rth in a thickness direction is less than 100 nm.

In an exemplary embodiment, a material of the protective layer away from the first liquid crystal panel among the two protective layers of the first polarizer is polyethylene terephthalate; a material of the protective layer away from the second liquid crystal panel among the two protective layers of the third polarizer is polyethylene terephthalate.

In an exemplary embodiment, the first liquid crystal panel is a light control panel; the second liquid crystal panel is a display panel; wherein, the display panel includes multiple grid lines extending along a first direction and a second direction crossing each other, and the grid lines define multiple sub-pixel units; the light control panel includes multiple signal lines extending along the first direction and the second direction crossing each other, and the signal lines define multiple light control units; at least part of the signal lines has a polyline route.

In an exemplary embodiment, the signal lines include multiple first signal lines extending along the first direction and multiple second signal lines extending along the second direction; the first signal line has a polyline route and includes multiple first polyline units arranged periodically and continuously, one of the first polyline units corresponds to one of the light control units, and one of the first polyline units includes a first part and a second part, and a first end of the first part is connected with a first end of the second part; the grid lines include multiple first grid lines extending along the first direction and multiple second grid lines extending along the second direction; an orthographic projection of an intersection of the first signal line and the second signal line on the display panel overlaps with the second grid line; an orthographic projection of a connection point of the first end of the first part and the first end of the second part of one of the first polyline units on the display panel overlaps with one of the second grid lines.

In an exemplary embodiment, the second signal line is a polyline route and includes multiple second polyline units arranged periodically and continuously, wherein one of the second polyline units corresponds to one of the light control units or one of the second polyline units corresponds to two of the light control units; one of the second polyline units includes a first part and a second part, and a first end of the first part of the second polyline unit is connected with a first end of the second part of the second polyline unit.

In an exemplary embodiment, a transmission axis of the second polarizer is perpendicular to that of the first polarizer, and a transmission axis of the third polarizer is perpendicular to that of the second polarizer.

In an exemplary embodiment, a refractive index of the protective layer close to the first liquid crystal panel among the two protective layers of the second polarizer is 1.45~1.60.

In an exemplary embodiment, a thickness of the protective layer close to the first liquid crystal panel among the two protective layers of the second polarizer is 30 um~80 um.

In an exemplary embodiment, the display apparatus further includes a fourth polarizer, wherein the fourth polarizer is positioned between the second polarizer and the first liquid crystal panel, or the fourth polarizer is positioned between the second polarizer and the second liquid crystal panel, and the fourth polarizer has a same structure as the second polarizer.

In an exemplary embodiment, an in-plane optical path difference compensation value Ro of the protective layer close to the first liquid crystal panel among the two protective layers of the second polarizer is less than 100 nm, and an optical path difference compensation value Rth in a thickness direction is less than 1000 nm.

In an exemplary embodiment, an in-plane optical path difference compensation value Ro of the protective layer close to the first liquid crystal panel among the two protective layers of the fourth polarizer is less than 100 nm, and an optical path difference compensation value Rth in a thickness direction is less than 1000 nm.

In an exemplary embodiment, an in-plane optical path difference compensation value Ro of the protective layer close to the first liquid crystal panel among the two protective layers of the second polarizer is less than 50 nm, and an optical path difference compensation value Rth in a thickness direction is less than 500 nm; an in-plane optical path difference compensation value Ro of the protective layer close to the first liquid crystal panel among the two protective layers of the fourth polarizer is less than 50 nm, and an optical path difference compensation value Rth in a thickness direction is less than 500 nm.

In an exemplary embodiment, an in-plane optical path difference compensation value Ro of the protective layer close to the first liquid crystal panel among the two protective layers of the second polarizer is less than 10 nm, and an optical path difference compensation value Rth in a thickness direction is less than 100 nm; an in-plane optical path difference compensation value Ro of the protective layer close to the first liquid crystal panel among the two protective layers of the fourth polarizer is less than 10 nm, and an optical path difference compensation value Rth in a thickness direction is less than 100 nm.

In an exemplary embodiment, in-plane optical path difference compensation values Ro of the two protective layers of the second polarizer are both less than 10 nm, and optical path difference compensation values Rth in a thickness direction are both less than 100 nm; in-plane optical path difference compensation values Ro of the two protective layers of the fourth polarizer are both less than 10 nm, and optical path difference compensation values Rth in a thickness direction are both less than 100 nm.

In an exemplary embodiment, a transmission axis of the second polarizer is perpendicular to that of the first polarizer, a transmission axis of the third polarizer is perpendicular to that of the second polarizer, and a transmission axis of the fourth polarizer is parallel to that of the second polarizer.

In an exemplary embodiment, a material of the protective layer close to the first liquid crystal panel among the two protective layers of the second polarizer is cellulose triacetate.

Other aspects will become apparent upon reading and understanding the drawings and detailed description.

Other features and advantages of the present disclosure will be set forth in the following description, and in part will become apparent from the description, or be learned by practice of the present disclosure. Purposes and advantages of the present disclosure may be realized and obtained by structures specifically pointed out in the specification, claims and drawings.

EXPLANATION OF REFERENCE SIGNS IN FIGS. 1 TO 6

Figure 1:
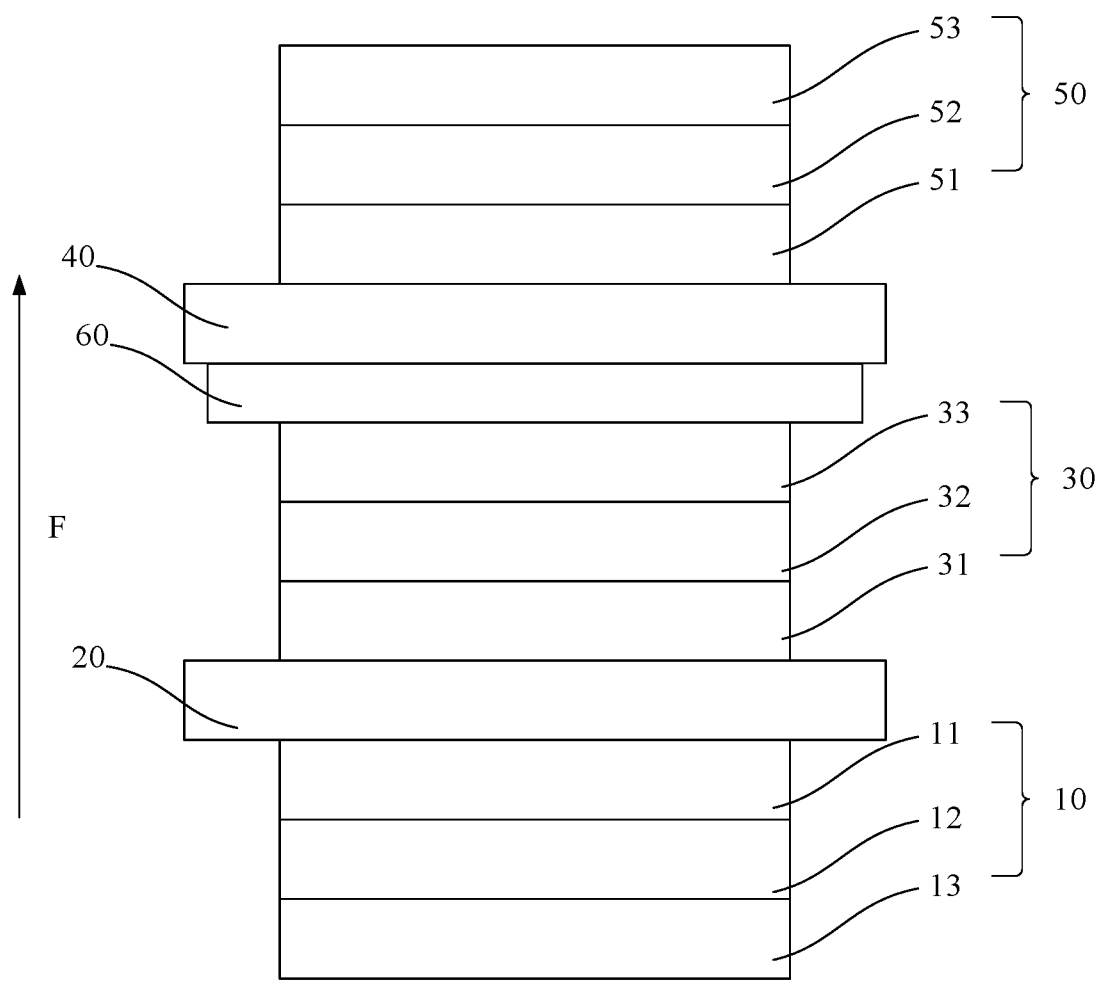
FIG. 1 is a schematic diagram showing cross-sectional structure of a display apparatus according to an embodiment of the present disclosure.

10: first polarizer
11: inner protective layer of a first polarizer
12: polarizing layer of a first polarizer
13: outer protective layer of a first polarizer
20: first liquid crystal panel
30: second polarizer
31: inner protective layer of a second polarizer
32: polarizing layer of a second polarizer
33: outer protective layer of a second polarizer
40: second liquid crystal panel
50: third polarizer
51: inner protective layer of a third polarizer
52: polarizing layer of a third polarizer
53: outer protective layer of a third polarizer
60: adhesive layer
70: fourth polarizer
80: light source
71: inner protective layer of a fourth polarizer
72: polarizing layer of a fourth polarizer
73: outer protective layer of a fourth polarizer
F: light emitting direction of a display apparatus

EXPLANATION OF REFERENCE SIGNS IN FIGS. 7 TO 9

20: light control panel
24: signal line
241: first signal line
242: second signal line
25: first polyline unit
251: first part
252: second part
27: light control unit
28: second polyline unit
281: first part
282: second part
40: display panel
43: grid line 431: first grid line
432: second grid line
46: pixel unit
461: first sub-pixel unit
462: second sub-pixel unit
463: third sub-pixel unit

DETAILED DESCRIPTION

Exemplary embodiments will be described in detail below, and their examples are shown in the accompanying drawings. When following description refers to the drawings, unless otherwise indicated, a same number in different drawings indicates a same or similar element. The embodiments described in following exemplary embodiments do not represent all embodiments according to the present disclosure. Rather, they are merely examples of an apparatus according to some aspects of the present disclosure as detailed in the appended claims.

Based on the described embodiments of the present disclosure, all other embodiments obtained by those of ordinary skills in the art without inventive effort are covered by the scope of protection of the present disclosure. It should be understood that the embodiments described below are only used to illustrate and explain the present disclosure, and are not used to limit the present disclosure. Moreover, without a conflict, the embodiments in the present disclosure and features in the embodiments may be combined with each other.

Terms used in the present disclosure are for a purpose of describing specific embodiments only, and are not intended to limit the present disclosure. Unless otherwise defined, technical terms or scientific terms used in the present disclosure shall have an ordinary meaning understood by those with ordinary skills in the art to which the present disclosure pertains. Words such as "a" or "an", or the like used in the specification and claims of the present disclosure do not mean limitation of quantity, but mean existence of at least one. Words such as "including" or "containing", or the like mean that elements or articles appearing before "including" or "containing" cover elements or articles and their equivalents listed and appearing after "including" or "containing", and do not exclude other elements or articles. The word "connected", "connected with", or the like is not limited to physical or mechanical connections, and may include electrical connections, either directly or indirectly. "Multiple" includes two, which is equivalent to at least two. Singular forms "a", "the" and "the" used in the specification of the present disclosure and the appended claims are also intended to include the plural forms, unless the context clearly indicates another meaning. It should also be understood that the term "and/or" used herein refers to and contains any or all possible combinations of one or more associated listed items.

Referring to FIGS. 1 to 4, an embodiment of the present disclosure provides a display apparatus. The display apparatus includes a first polarizer 10, a first liquid crystal panel 20, a second polarizer 30, a second liquid crystal panel 40 and a third polarizer 50, which are sequentially stacked and disposed along a light emitting direction F. Herein, the first liquid crystal panel 20 is a dimming panel. The second liquid crystal panel 40 is a display panel. A transmission axis of the second polarizer 30 is perpendicular to that of the first polarizer 10, and a transmission axis of the third polarizer 50 is perpendicular to that of the second polarizer 30. In this way, a contrast ratio of the display apparatus may be improved to over 40,000 by the structure of a double-layer liquid crystal panel.

The second polarizer 30 includes two protective layers, and a polarizing layer positioned between the two protective layers. The protective layer is disposed to protect the polarizing layer. The two protective layers are positioned on the upper surface and lower surface of the polarizing layer respectively, and are an inner protective layer and an outer protective layer. The inner protective layer is provided with an adhesive material so as to be able to be bonded with the first liquid crystal panel 20 or the second liquid crystal panel 40.

As shown in FIG. 1, the second polarizer 30 is disposed on the first liquid crystal panel 20, that is, the inner protective layer 31 of the second polarizer is bonded to the first liquid crystal panel 20 through an adhesive material, and the inner protective layer 31 of the second polarizer is the protective layer close to the first liquid crystal panel 20 among the two protective layers. The outer protective layer 33 of the second polarizer is the protective layer away from the first liquid crystal panel 20 among the two protective layers. A polarizing layer 32 of the second polarizer is positioned between the inner protective layer 31 of the second polarizer and the outer protective layer 33 of the second polarizer. At this time, lights form the light source positioned below the first liquid crystal panel 20 first go through the inner protective layer 31 of the second polarizer. By setting an in-plane optical path difference compensation value Ro of the inner protective layer 31 of the second polarizer to be less than 100 nm and an optical path difference compensation value Rth in a thickness direction to be less than 1000 nm, it may be realized that the display apparatus maintains a contrast ratio of over 80,000. That is, by further limiting value ranges of the in-plane optical path difference compensation value Ro of the inner protective layer 31 of the second polarizer and the optical path difference compensation value Rth on the thickness direction, a beneficial effect of improving the contrast ratio of the display apparatus can be even further realized (from over 40,000 to over 80,000). This is because that lights have passed through the first polarizer 10 to become polarized lights before reaching the second polarizer 30, and before the polarized lights pass through the polarizing layer 32 of the second polarizer, it can be caused that less linearly polarized lights become linearly polarized lights perpendicular to the linearly polarized lights through a protective layer made of a material with a small phase difference, and thus less lights pass through the polarizing layer 32, which can achieve a beneficial effect of improving a final display contrast ratio of the display apparatus.

Figure 2:
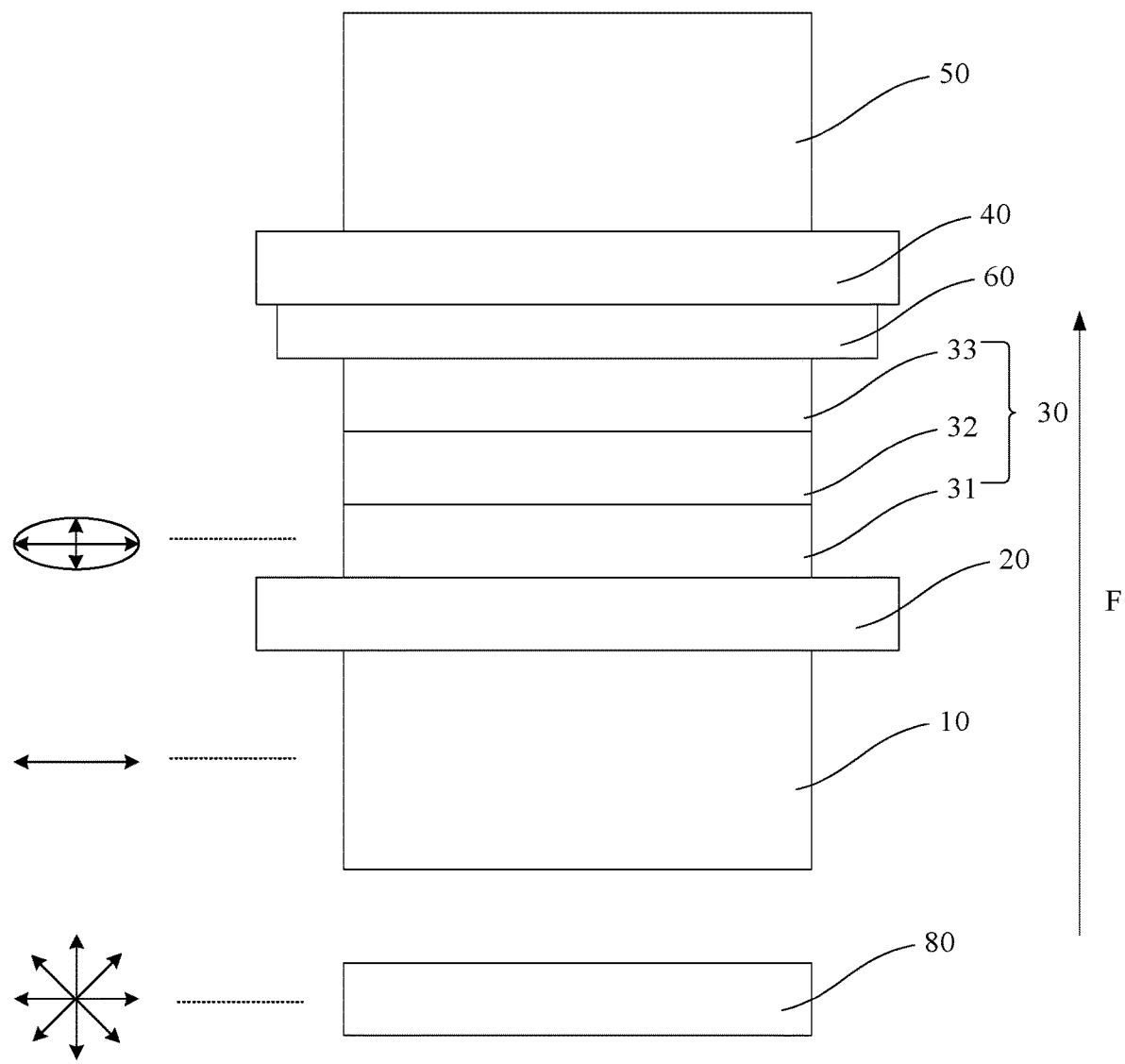
FIG. 2 is a schematic diagram showing an optical path change of a first case of the display apparatus according to an embodiment of the present disclosure.

In an exemplary embodiment, as shown in FIG. 2, a light source 80 is positioned below the first polarizer 10, and natural lights emitted by the light source 80 go through the first polarizer 10 to become polarized lights. The inner protective layer 31 of the second polarizer in FIG. 2 is a protective layer made of a material with a large phase difference, which makes, after the polarized lights go through the protective layer, the polarized lights become elliptically polarized light due to the large phase difference of the material of the protective layer, so that there are polarized lights which are perpendicular to the polarized lights and pass through the polarizing layer 32 of the second polarizer, thereby affecting a final display effect.

Figure 3:
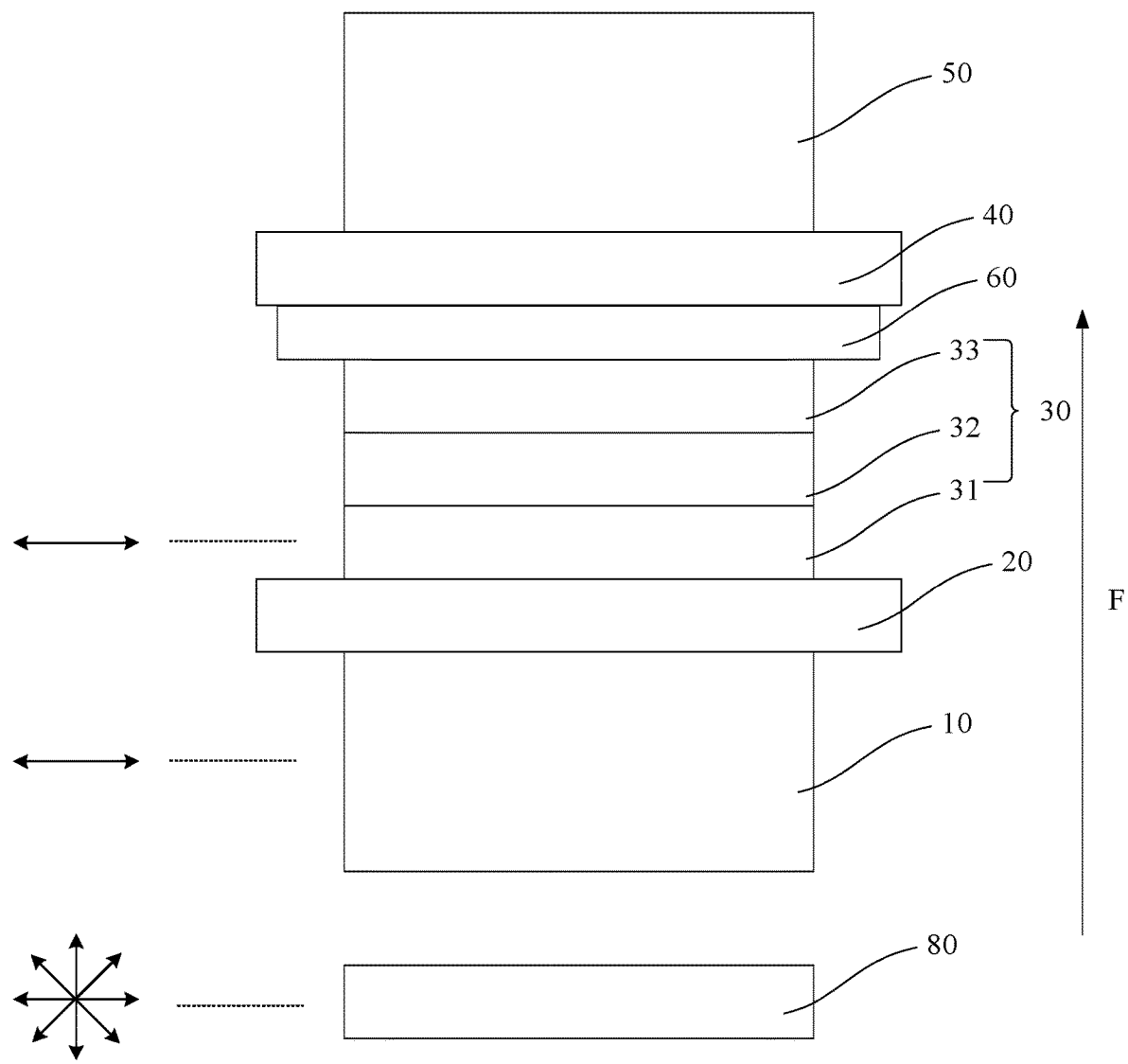
FIG. 3 is a schematic diagram showing an optical path change of a second case of the display apparatus according to an embodiment of the present disclosure.

As shown in FIG. 3, the inner protective layer 31 of the second polarizer in FIG. 3 is a protective layer made of a material with a small phase difference. There is only a small amount or no polarized lights which are perpendicular to the polarized lights and passes through the polarizing layer 32 of the second polarizer, due to the small phase difference of the material of the protective layer, thereby achieving a beneficial effect of further improved final display contrast ratio of the display apparatus.

In an exemplary embodiment, the in-plane optical path difference compensation value Ro of the inner protective layer 31 of the second polarizer is less than 50 nm, and the optical path difference compensation value Rth in the thickness direction is less than 500 nm. In this way, by setting the in-plane optical path difference compensation value Ro of the inner protective layer 31 of the second polarizer to be less than 50 nm, and the optical path difference compensation value Rth on the thickness direction to be less than 500 nm, it may be realized that the display apparatus maintains a contrast ratio of over 100,000.

In an exemplary embodiment, the in-plane optical path difference compensation value Ro of the inner protective layer 31 of the second polarizer is less than 10 nm, and the optical path difference compensation value Rth in the thickness direction is less than 100 nm. In this way, by setting the in-plane optical path difference compensation value Ro of the inner protective layer 31 of the second polarizer to be less than 10 nm, and the optical path difference compensation value Rth on the thickness direction to be less than 100 nm, it may be realized that the display apparatus maintains a contrast ratio of over 150,000.

In an exemplary embodiment, it may be set that the in-plane optical path difference compensation values Ro of the inner protective layer 31 and the outer protective layer 33 of the second polarizer are both less than 10 nm, and the optical path difference compensation values Rth in the thickness direction of the inner protective layer 31 and the outer protective layer 33 are both less than 100 nm, so as to ensure that the display apparatus maintains a contrast ratio of over 150,000.

The material of the inner protective layer 31 of the second polarizer is one of TAC (cellulose triacetate), Acrylic (polymethylmethacrylate) and No Retardation TAC (NRT, a chinese name of which is zero phase difference TAC), that is, the inner protective layer 31 of the second polarizer is made of a material with a small phase difference to achieve a technical effect of improving a contrast ratio. In an exemplary embodiment, the material of the inner protective layer 31 of the second polarizer is TAC.

In an exemplary embodiment, a refractive index of the inner protective layer 31 of the second polarizer is 1.45~1.60, and the thickness is 30 um~80 um.

In an exemplary embodiment, the display apparatus further includes an adhesive layer 60, wherein the adhesive layer 60 is disposed to bond the first liquid crystal panel 20 and the second liquid crystal panel 40 together. As mentioned above, since the second polarizer 30 is first bonded to the first liquid crystal panel 20 through the adhesive material, the adhesive layer 60 is positioned between the second polarizer 30 and the second liquid crystal panel 40.

In addition, in an exemplary embodiment, the first polarizer 10 and the third polarizer 50 both have a same structure as the second polarizer 30. That is, the first polarizer includes two protective layers and a polarizing layer positioned between the two protective layers; and the third polarizer also includes two protective layers and a polarizing layer positioned between the two protective layers. Herein, the first polarizer 10 is disposed on the first liquid crystal panel 20, that is, the inner protective layer 11 of the first polarizer is bonded to the first liquid crystal panel 20 through an adhesive material, and the inner protective layer 11 of the first polarizer is the protective layer close to the first liquid crystal panel 20 among the two protective layers; the outer protective layer 13 of the first polarizer is the protective layer away from the first liquid crystal panel 20 among the two protective layers; and a polarizing layer 12 of the first polarizer is positioned between the inner protective layer 11 of the first polarizer and the outer protective layer 13 of the first polarizer. The third polarizer 50 is disposed on the second liquid crystal panel 40, that is, the inner protective layer 51 of the third polarizer is bonded to the second liquid crystal panel 40 through an adhesive material, and the inner protective layer 51 of the third polarizer is the protective layer close to the second liquid crystal panel 40 among the two protective layers; an outer protective layer 53 of the third polarizer is the protective layer away from the second liquid crystal panel 40 among the two protective layers; and the polarizing layer 52 of the third polarizer is positioned between the inner protective layer 51 of the third polarizer and the outer protective layer 53 of the third polarizer.

In an exemplary embodiment, it may be set that the in-plane optical path difference compensation value Ro of the protective layer of the inner protective layer 11 of the first polarizer is less than 10 nm, and the optical path difference compensation value Rth in the thickness direction is less than 100 nm, so as to better ensure that the display apparatus maintains a contrast ratio of over 150,000. The inner protective layer 11 of the first polarizer is the protective layer close to the first liquid crystal panel 20 among the two protective layers of the first polarizer 10.

Similarly, in an exemplary embodiment, it may be set that the in-plane optical path difference compensation value Ro of the inner protective layer 51 of the third polarizer is less than 10 nm, and the optical path difference compensation value Rth in the thickness direction is less than 100 nm, so as to better ensure that the display apparatus maintains a contrast ratio of over 150,000. The inner protective layer 51 of the third polarizer, that is, the inner protective layer 51 of the third polarizer 50, is the protective layer close to the second liquid crystal panel 40 among the two protective layers.

In an exemplary embodiment, materials of the outer protective layer 13 of the first polarizer and the outer protective layer 53 of the third polarizer are PET (polyethylene terephthalate), which has a certain hardness, so a certain role in protection can be played.

Figure 4:
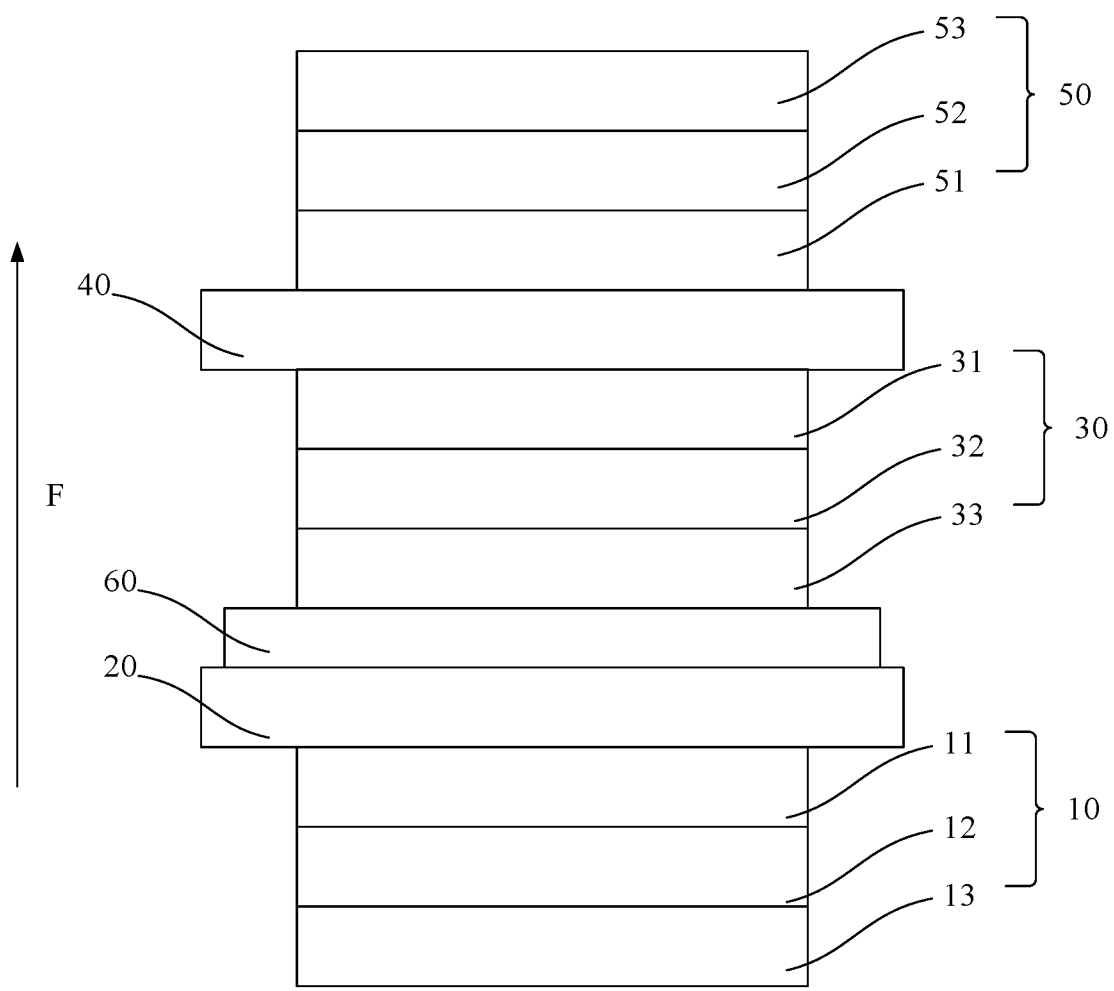
FIG. 4 is a schematic diagram showing cross-sectional structure of a display apparatus according to another implementation of an embodiment of the present disclosure.

As shown in FIG. 4, in another exemplary embodiment, the second polarizer 30 is disposed on the second liquid crystal panel 40, that is, the inner protective layer 31 of the second polarizer is bonded to the second liquid crystal panel 40 through an adhesive material, the outer protective layer 33 of the second polarizer is the protective layer close to the first liquid crystal panel 20 among the two protective layers; while the inner protective layer 31 of the second polarizer is the protective layer away from the first liquid crystal panel 20 among the two protective layers. At this time, lights from a light source positioned below the first liquid crystal panel 20 first go through the outer protective layer 33 of the second polarizer. By setting an in-plane optical path difference compensation value Ro of the outer protective layer 33 of the second polarizer to be less than 100 nm and an optical path difference compensation value Rth in a thickness direction to be less than 1000 nm, it may be realized that the display apparatus maintains a contrast ratio of over 80,000.

Similarly, in an exemplary embodiment, the in-plane optical path difference compensation value Ro of the outer protective layer 33 of the second polarizer is less than 50 nm, and the optical path difference compensation value Rth in the thickness direction is less than 500 nm. In this way, by setting the in-plane optical path difference compensation value Ro of the outer protective layer 33 of the second polarizer to be less than 50 nm, and the optical path difference compensation value Rth in the thickness direction to be less than 500 nm, it may be realized that the display apparatus maintains a contrast ratio of over 100,000.

In an exemplary embodiment, the in-plane optical path difference compensation value Ro of the outer protective layer 33 of the second polarizer is less than 10 nm, and the optical path difference compensation value Rth in the thickness direction is less than 100 nm. In this way, by setting the in-plane optical path difference compensation value Ro of the outer protective layer 33 of the second polarizer to be less than 10 nm, and the optical path difference compensation value Rth in the thickness direction to be less than 100 nm, it may be realized that the display apparatus maintains a contrast ratio of over 150,000.

The adhesive layer 60 is positioned between the second polarizer 30 and the first liquid crystal panel 20.

According to the display apparatus in the embodiment of the present disclosure, by setting value ranges of the in-plane optical path difference compensation value Ro of the protective layer close to the first liquid crystal panel 20 among the two protective layers of the second polarizer 30 and the optical path difference compensation value Rth in the thickness direction, a beneficial effect of improving a contrast ratio of the display apparatus may be achieved.

Figure 5:
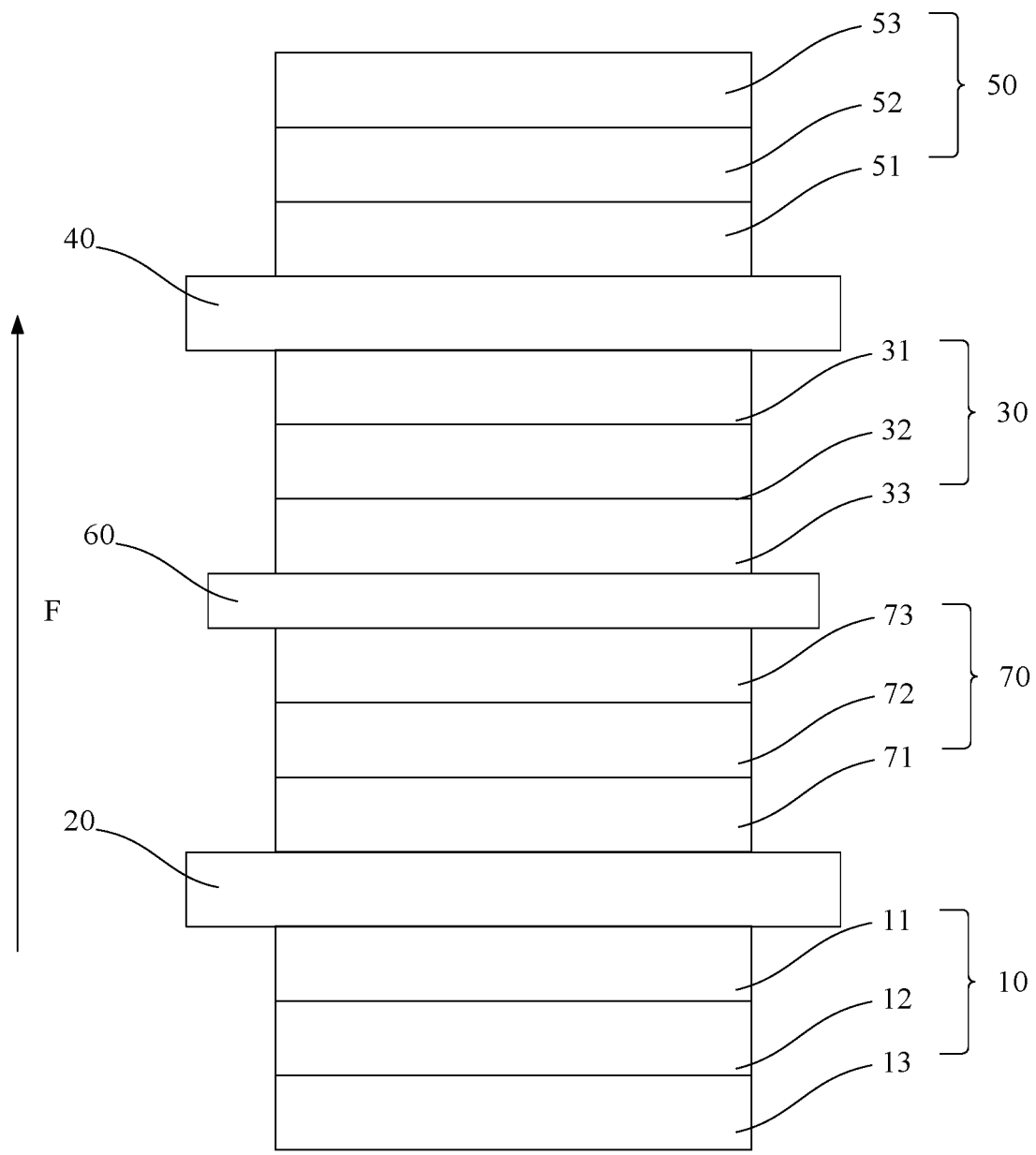
FIG. 5 is a schematic diagram showing cross-sectional structure of a display apparatus according to an embodiment of the present disclosure.
Figure 6:
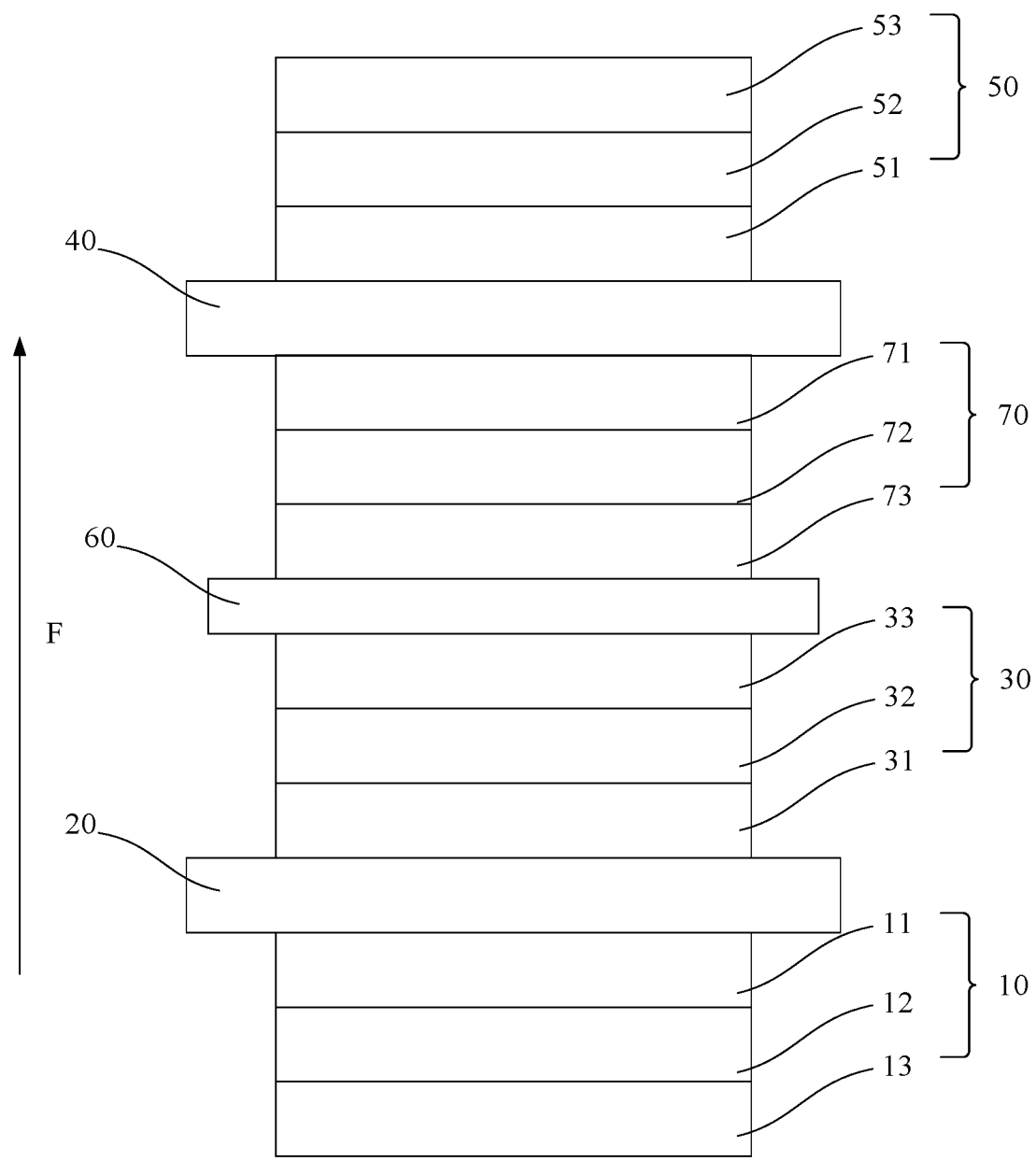
FIG. 6 is a schematic diagram showing cross-sectional structure of a display apparatus according to another implementation of an embodiment of the present disclosure.

As shown in FIG. 5 and FIG. 6, an overall structure of the display apparatus according to the embodiment of the present disclosure is similar to that in the above embodiment, and a difference is that the display apparatus further includes a fourth polarizer 70, and the fourth polarizer 70 has a same structure as the second polarizer 30. The fourth polarizer 70 is positioned between the second polarizer 30 and the first liquid crystal panel 20, or the fourth polarizer 70 is positioned between the second polarizer 30 and the second liquid crystal panel 40. A transmission axis of the second polarizer 30 is perpendicular to that of the first polarizer 10, a transmission axis of the third polarizer 50 is perpendicular to that of the second polarizer 30, and a transmission axis of the fourth polarizer 70 is parallel to that of the second polarizer 30.

As shown in FIG. 5, the fourth polarizer 70 is positioned between the second polarizer 30 and the first liquid crystal panel 20, that is, the fourth polarizer 70 is disposed in the first liquid crystal panel 20 and the second polarizer 30 is disposed in the second liquid crystal panel 40.

The outer protective layer 33 of the second polarizer is the protective layer close to the first liquid crystal panel 20 among the two protective layers, and the inner protective layer 31 of the second polarizer is the protective layer away from the first liquid crystal panel 20 among the two protective layers. A polarizing layer 32 of the second polarizer is positioned between the inner protective layer 31 of the second polarizer and the outer protective layer 33 of the second polarizer. The inner protective layer 71 of the fourth polarizer is the protective layer close to the first liquid crystal panel 20 among the two protective layers, and the outer protective layer 73 of the fourth polarizer is the protective layer away from the first liquid crystal panel 20 among the two protective layers. The polarizing layer 72 of the fourth polarizer is positioned between the inner protective layer 71 of the fourth polarizer and the outer protective layer 73 of the fourth polarizer. At this time, lights form a light source positioned below the first liquid crystal panel 20 sequentially go through the inner protective layer 71 of the fourth polarizer, the polarizing layer 72 of the fourth polarizer, the outer protective layer 73 of the fourth polarizer, the outer protective layer 33 of the second polarizer, the polarizing layer 32 of the second polarizer and the inner protective layer 31 of the second polarizer.

By setting the in-plane optical path difference compensation value Ro of the outer protective layer 33 to be less than 100 nm, and the optical path difference compensation value Rth in the thickness direction to be less than 1000 nm, the in-plane optical path difference compensation value Ro of the inner protective layer 71 of the fourth polarizer to be less than 100 nm, and the optical path difference compensation value Rth in the thickness direction to be less than 1000 nm, as described in embodiment 1, the polarized lights first pass through the protective layer of the material with a small phase difference of a polarizer positioned between the first liquid crystal panel and the second liquid crystal panel, and then pass through the polarizing layer of the polarizer, it can be realized that the beneficial effect of improving the final display contrast ratio of the display apparatus. In the embodiment of the present disclosure, polarized lights sequentially pass through the protective layers (the inner protective layer 71 of the fourth polarizer and the outer protective layer 33 of the second polarizer) of materials with small phase differences of two polarizers positioned between the first liquid crystal panel 20 and the second liquid crystal panel 40, that is, the polarized lights pass through the protective layer of the material with the small phase difference twice before entering the polarizing layer 32 of the second polarizer close to the second liquid crystal panel 40, thereby the contrast ratio of the display apparatus can be further improved, while realizing that the display apparatus maintains a contrast ratio of over 240,000.

In an exemplary embodiment, by setting the in-plane optical path difference compensation value Ro of the outer protective layer 33 of the second polarizer to be less than 50 nm, and the optical path difference compensation value Rth in the thickness direction to be less than 500 nm, the in-plane optical path difference compensation value Ro of the inner protective layer 71 of the fourth polarizer to be less than 50 nm, and the optical path difference compensation value Rth on the thickness direction to be less than 500 nm, it may be realized that the display apparatus maintains a contrast ratio of over 240,000.

In an exemplary embodiment, by setting the in-plane optical path difference compensation value Ro of the outer protective layer 33 of the second polarizer to be less than 10 nm, and the optical path difference compensation value Rth in the thickness direction to be less than 100 nm, the in-plane optical path difference compensation value Ro of the inner protective layer 71 of the fourth polarizer to be less than 10 nm, and the optical path difference compensation value Rth on the thickness direction to be less than 100 nm, it may be realized that the display apparatus maintains a contrast ratio of over 450,000.

In an exemplary embodiment, it may be set that the in-plane optical path difference compensation values Ro of the inner protective layer 31 and the outer protective layer 33 of the second polarizer are both less than 10 nm, and the optical path difference compensation values Rth in the thickness direction of the inner protective layer 31 and the outer protective layer 33 are both less than 100 nm, and it is set that the in-plane optical path difference compensation values Ro of the inner protective layer 71 and the outer protective layer 73 of the fourth polarizer are both less than 10 nm, and the optical path difference compensation values Rth in the thickness direction of the inner protective layer 71 and the outer protective layer 73 are both less than 100 nm, so as to ensure that the display apparatus maintains a contrast ratio of over 150,000.

In an exemplary embodiment, a refractive index of the outer protective layer 33 of the second polarizer is 1.45~1.60; a refractive index of the inner protective layer 71 of the fourth polarizer is 1.45~1.60. A thickness of the outer protective layer 33 of the second polarizer is 30 um~80 um; and a thickness of the inner protective layer 71 of the fourth polarizer is 30 um~80 um.

In an exemplary embodiment, the adhesive layer 60 is disposed between the second polarizer 30 and the fourth polarizer 70.

As shown in FIG. 6, in another exemplary embodiment, the fourth polarizer 70 is positioned between the second polarizer 30 and the second liquid crystal panel 40, that is, the fourth polarizer 70 is disposed in the second liquid crystal panel 40 while the second polarizer 30 is disposed in the first liquid crystal panel 20.

The inner protective layer 31 of the second polarizer is the protective layer close to the first liquid crystal panel 20 among the two protective layers; while the outer protective layer 33 of the second polarizer is the protective layer away from the first liquid crystal panel 20 among the two protective layers. The outer protective layer 73 of the fourth polarizer is the protective layer close to the first liquid crystal panel 20 among the two protective layers; while the inner protective layer 71 of the fourth polarizer is the protective layer away from the first liquid crystal panel 20 among the two protective layers. At this time, a light source positioned below the first liquid crystal panel 20 sequentially goes through the inner protective layer 31 of the second polarizer, the polarizing layer 32 of the second polarizer, the outer protective layer 33 of the second polarizer, the outer protective layer 73 of the fourth polarizer, the polarizing layer 72 of the fourth polarizer and the inner protective layer 71 of the fourth polarizer.

By setting the in-plane optical path difference compensation value Ro of the inner protective layer 31 of the second polarizer to be less than 100 nm, and the optical path difference compensation value Rth in the thickness direction to be less than 1000 nm, the in-plane optical path difference compensation value Ro of the outer protective layer 73 of the fourth polarizer to be less than 100 nm, and the optical path difference compensation value Rth in the thickness direction to be less than 1000 nm, the contrast ratio of the display apparatus can be further improved, while realizing that the display apparatus maintains a contrast ratio of above 240,000.

Similarly, in an exemplary embodiment, by setting the in-plane optical path difference compensation value Ro of the inner protective layer 31 of the second polarizer to be less than 50 nm, and the optical path difference compensation value Rth in the thickness direction to be less than 500 nm, the in-plane optical path difference compensation value Ro of the outer protective layer 73 of the fourth polarizer to be less than 50 nm, and the optical path difference compensation value Rth in the thickness direction to be less than 500 nm, it may be realized that the display apparatus maintains a contrast ratio of over 240,000.

In an exemplary embodiment, by setting the in-plane optical path difference compensation value Ro of the inner protective layer 31 of the second polarizer to be less than 10 nm, and the optical path difference compensation value Rth in the thickness direction to be less than 100 nm, the in-plane optical path difference compensation value Ro of the outer protective layer 73 of the fourth polarizer to be less than 10 nm, and the optical path difference compensation value Rth in the thickness direction to be less than 100 nm, it may be realized that the display apparatus maintains a contrast ratio of over 450,000.

The adhesive layer 60 is still disposed between the second polarizer 30 and the fourth polarizer 70.

According to the display apparatus in the embodiment of the present disclosure, when the stacked first liquid crystal panel 20 and second liquid crystal panel 40 are respectively provided with two polarizers to realize display, the beneficial effect of improving the contrast ratio of the display apparatus can be further realized by setting the value ranges of the in-plane optical path difference compensation value Ro of the protective layer close to the first liquid crystal panel 20 among the two respective protective layers in the two polarizers positioned in the middle and the optical path difference compensation value Rth in the thickness direction.

An overall structure of the display apparatus according to the embodiment of the present disclosure is similar to that in the above embodiment, and a difference is that the first liquid crystal panel of the display apparatus is a light control panel, and the second liquid crystal panel is a display panel. The display apparatus also includes a light source, and the light source is positioned below a light control panel. The light control panel may control light transmittance in a predetermined area. For parts with higher picture brightness (or gray scale), the light transmittance of a corresponding area of the light control panel is also high to allow more lights from the light source to pass through, while for parts with lower picture brightness, the light transmittance of a corresponding area of the light control panel is also low to allow less lights from the light source to pass through, thus achieving purposes of improving a contrast ratio of the display picture and enhancing a display image quality.

In an exemplary embodiment, the display panel includes multiple grid lines extending along a first direction and a second direction crossing each other, and the grid lines define multiple sub-pixel units. Three sub-pixel units continuously arranged along the first direction constitute one pixel unit. The light control panel is configured to allow lights from a light source to be incident on the display panel via it, and includes multiple signal lines extending along the first direction and the second direction crossing each other, and the signal lines define multiple light control units; at least part of the signal lines has a polyline route.

Figure 7:
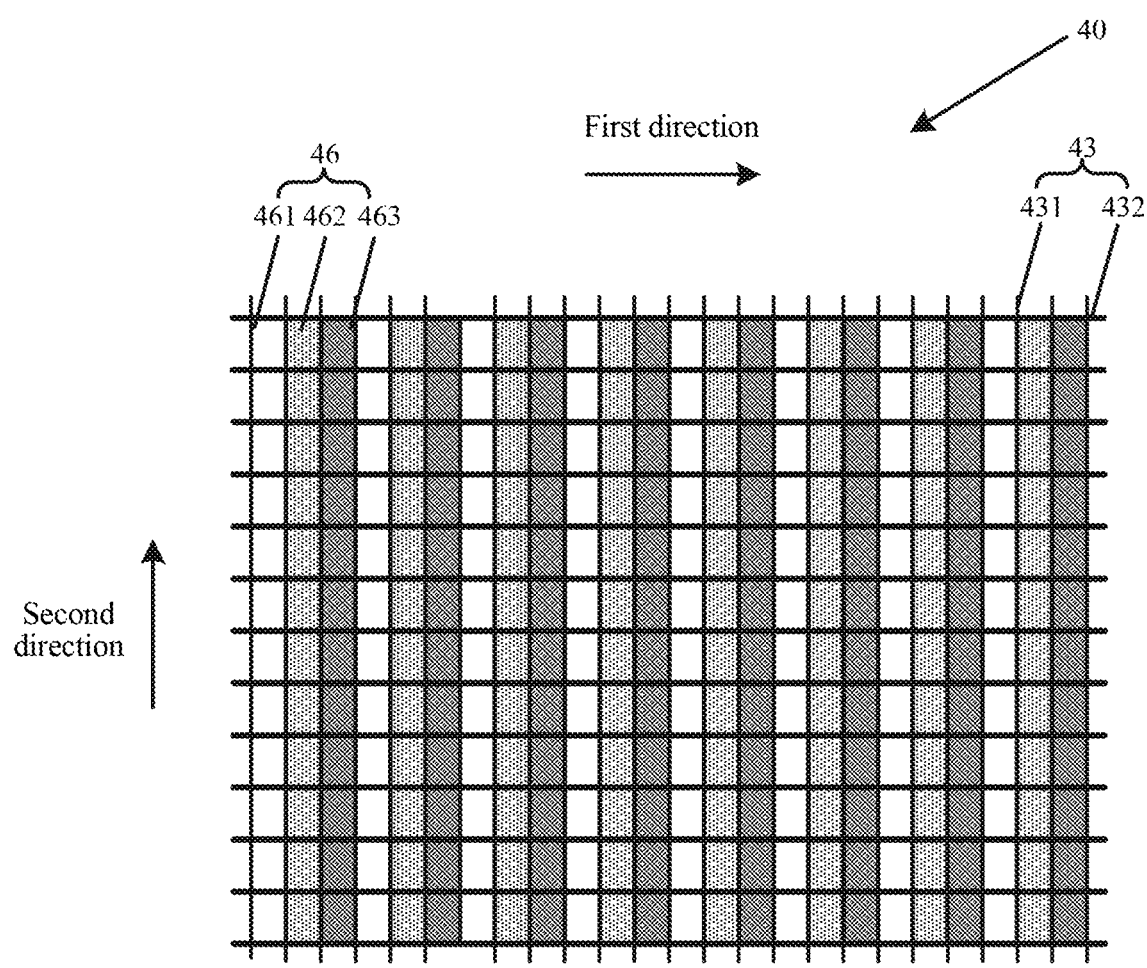
FIG. 7 is a schematic diagram showing a partial planar structure of a second liquid crystal panel of a display apparatus according to an embodiment of the present disclosure.
Figure 8:
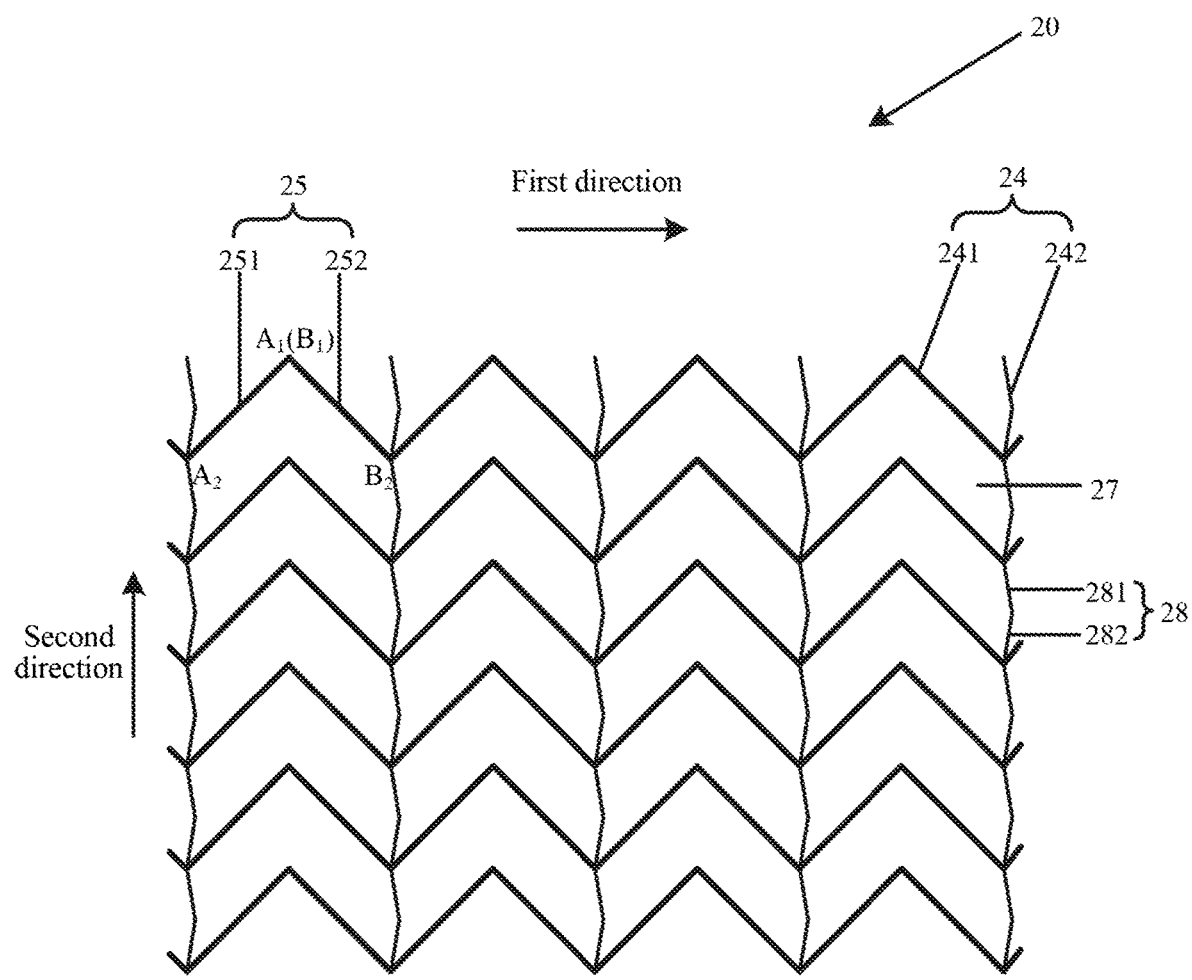
FIG. 8 is a schematic diagram showing a partial planar structure of a first liquid crystal panel of a display apparatus according to an embodiment of the present disclosure.
Figure 9:
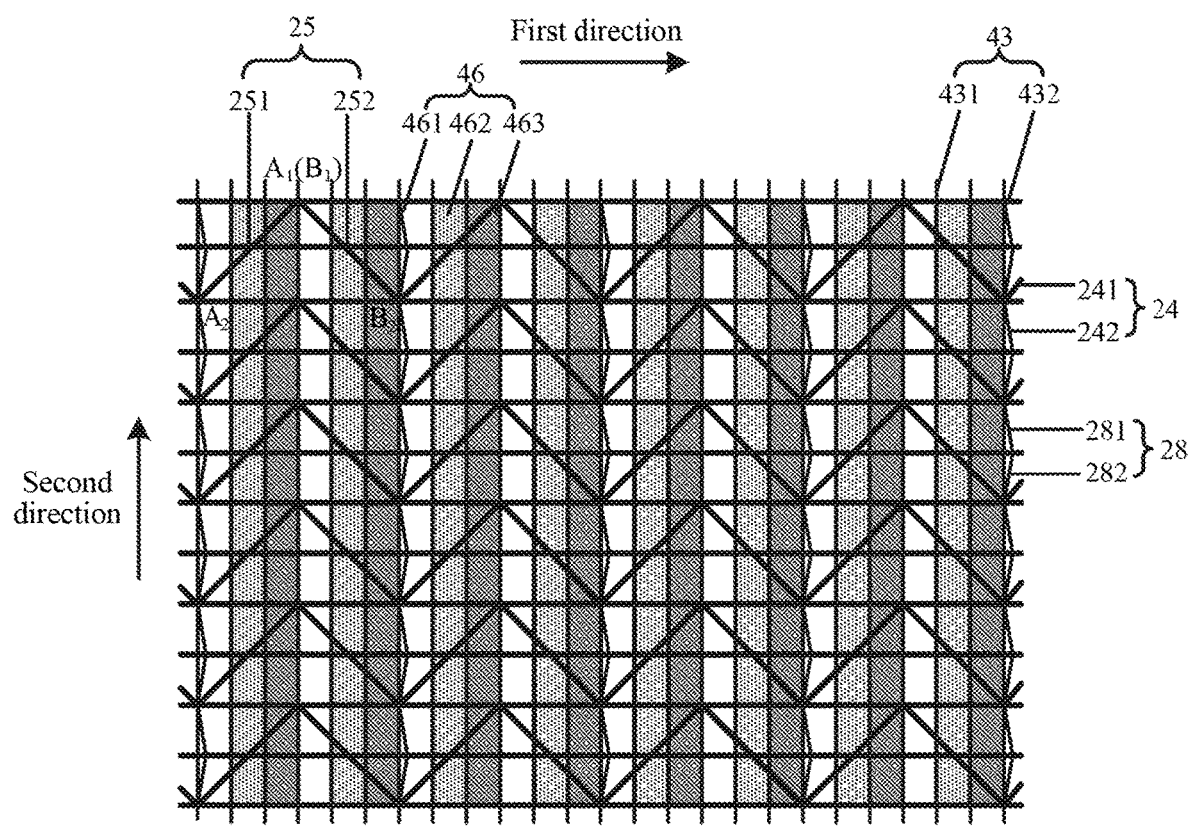
FIG. 9 is a schematic diagram showing a partial planar structure of a display apparatus according to an embodiment of the present disclosure.

As shown in FIGS. 7 to 9, the display panel 40 is disposed to realize a display function; the light control panel 20 is configured to allow lights from a light source to be incident on the display panel 40 through it, and the light control panel 20 is disposed to control a direction or an intensity of the lights from the light source incident on the display panel 40 according to a requirement, for example, the requirement of realizing conversion between a narrow viewing angle and a wide viewing angle, the requirement of controlling different light emission intensities at various positions of the display apparatus, or the like. FIG. 7 is a schematic diagram of a partial planar structure of a second liquid crystal panel (display panel) of a display apparatus. As shown in FIG. 7, the display panel 40 includes multiple grid lines 43 extending along a first direction and a second direction crossing each other, and the grid lines 43 define multiple sub-pixel units. N sub-pixel units continuously arranged along the first direction constitute one pixel unit 46. N is a positive integer. For example, as shown in FIG. 7, N=3, and three sub-pixel units in one pixel unit 46 are, for example, a first sub-pixel unit 461, a second sub-pixel unit 462 and a third sub-pixel unit 463. For example, N sub-pixel units in one pixel unit 46 respectively emit different color lights to realize color display. For example, the first sub-pixel unit 461, the second sub-pixel unit 462 and the third sub-pixel unit 463 respectively emit red light, green light and blue light. In another embodiment, 4 sub-pixel units continuously arranged along the first direction may constitute one pixel unit, for example, the 4 sub-pixel units respectively emit red light, green light, blue light and white light. Of course, it is not limited to cases listed above, and the sub-pixel units included in one pixel unit 46 may be designed as required.

FIG. 8 is a schematic diagram of a partial planar structure of a first liquid crystal panel (light control panel) of a display apparatus, and FIG. 9 is a schematic diagram of a partial planar structure of a display apparatus provided by an embodiment of the present disclosure (i.e., a schematic diagram of a partial planar structure after stacking the light control panel shown in FIG. 8 and the display panel shown in FIG. 7).

As shown in FIG. 8, the light control panel 20 includes multiple signal lines 24 extending along a first direction and a second direction crossing each other, and these signal lines 24 crossing each other define multiple light control units 27. For example, multiple grid lines 43 of the display panel 40 are straight lines extending along a first direction and a second direction crossing each other. For example, plane shapes of multiple sub-pixel units defined by these grid lines 43 crossing each other are all rectangular. At least part of the signal lines 24 has a polyline route, so that the planar shape of the light control unit 27 is different from that of the sub-pixel units. For example, the planar shape of the light control unit 27 is not rectangular, for example, it is an irregular figure shown in FIG. 8. In addition, for example, on the first direction or the second direction, an orthographic projection of the signal line 24 on the display panel 40 crosses the grid line 43, and the signal line 24 does not have a same or similar pattern as the grid line 43, which hence causes that the human eye cannot feel moire, achieving an effect of eliminating or improving the moire.

The display apparatus provided by the embodiment of the present disclosure may achieve a good effect of eliminating moire, without needing to add an extra film layer specially used for eliminating moire, while controlling a direction or an intensity of lights from a light source incident to the display panel 40.

Multiple pixel units 46 and multiple light control units 27 are arranged in an array, and have respective arrangement periods on the first direction and the second direction, respectively. For example, the signal line 24 includes multiple first signal lines 241 extending along a first direction and multiple second signal lines 242 extending along a second direction, and the first signal lines 241 and the second signal lines 242 cross each other. As shown in FIG. 8, for example, the first signal line 241 has a polyline route and includes multiple first polyline units 25 arranged periodically and continuously, and one first polyline unit 25 corresponds to one light control unit 27, that is, the first polyline unit 25 crosses one light control unit 27 in the first direction. Moreover, each first polyline unit 25 includes a first part 251 and a second part 252. A first end A1 of the first part 251 is connected with a first end B1 of the second part 252, that is, a connection point of the first part 251 and the second part 252 is A1 (B1), and the points A1 and B1 coincide. The above continuous periodic arrangement refers to that each first polyline unit 25 has a same pattern, and two adjacent first polyline units 25 are continuously distributed, and a second end A2 of the first part 251 of one first polyline unit 25 is connected with a second end B2 of the second part 252 of the first polyline unit 25 adjacent thereto, for example, two adjacent first polyline units 25 are connected at point A2, point B2, etc. A pattern of this kind of polyline route of the first signal line 241 can achieve a good effect of eliminating or improving moire, and is simple in structure and convenient to manufacture.

The grid lines 43 include multiple first grid lines 431 extending along a first direction and multiple second grid lines 432 extending along a second direction. As shown in FIG. 9, for example, an orthographic projection of intersection (e.g., the point A2, the point B2) of the first signal line 241 and the second signal line 242 on the display panel overlaps with the second grid line. An orthographic projection of the connection point A1 (B1) of the first end A1 of the first part 51 and the first end B1 of the second part 52 of the first polyline unit 25 on the display panel overlaps with one second grid line 432. For example, the intersection point of the first signal line 241 and the second signal line 242 is also intersection point of two adjacent first polyline units 25, for example, the intersection point is the point A2, the point B2. In this way, it is caused that a boundary point of adjacent light control units 27 overlaps with the grid lines 43 in a direction perpendicular to the display panel, so that a corresponding relationship between an orthographic projection of the signal line 24 on the display panel and a pattern formed by the grid lines 43 is relatively regular, which is beneficial to achieve a good effect of eliminating moire.

As shown in FIG. 9, multiple pixel units 46 and multiple light control units 27 are arranged in an array respectively, the multiple pixel units 46 have a same size and shape, and the multiple light control units 27 have a same size and shape.

As shown in FIG. 9, the second signal line 242 has a polyline route and includes multiple second polyline routes 28 arranged periodically and continuously, one second polyline route unit 28 may correspond to one light control unit 27, one second polyline route unit 28 includes a first part 281 and a second part 282, and a first end of the first part 281 of the second polyline route unit 28 is connected with a first end of the second part 282 of the second polyline route unit, with a connection point of point M. In this way, the second signal line 242 and the first signal line 241 both have polyline routes to further improve the effect of eliminating moire.

In an exemplary embodiment, the first signal line 241 is a first gate line, and the second signal line 242 is a first data line, and the first gate line and the first data line are configured to drive rotation of liquid crystal molecules (not shown) in the light control unit 27 of the light control panel 20, so as to realize adjustment of an emergent angle or an intensity of lights from a light source by the light control panel 20. In another embodiment, the first signal line 241 is a first data line, and the second signal line 242 is a first gate line. More specifically, each light control unit 27 includes a thin film transistor (as a switching element), a pixel electrode and a common electrode. A gate of the thin film transistor is connected with a first gate line to receive a gate signal, a first pole (e.g., source) of the thin film transistor is connected with a first data line to receive a data signal, and a first pole (e.g., drain) of the thin film transistor is connected with a pixel electrode to charge the pixel electrode when it is in an on state. The common electrode and the pixel electrode form a liquid crystal capacitor together with a liquid crystal layer. When the pixel electrode is charged, an electric field is formed between the common electrode and the pixel electrode to control rotation of liquid crystal molecules in the liquid crystal layer. According to whether the light control panel is a vertical electric field type or a horizontal electric field type, the common electrode and the pixel electrode may be positioned on a same substrate and disposed adjacent to each other, or positioned on different substrates and facing each other.

In an exemplary embodiment, the grid lines 43 may include a second gate line and a second data line. The second gate line and the second data line are configured to drive rotation of liquid crystal molecules (not shown) in sub-pixel units of the display panel 40. Or, in another embodiment, the grid line 43 may further include a black matrix arranged to prevent crosstalk between colors of adjacent sub-pixel units. The black matrix includes a first black matrix strip extending along a first direction and a second black matrix strip extending along a second direction. On a direction perpendicular to a display surface of the display apparatus, the first black matrix strip covers a first signal line (e.g., gate line) extending along the first direction, for example, having a same contour as the first signal line, and the second black matrix strip covers the second signal line (e.g., data line) extending along the second direction, for example, having a same contour as the second signal line. More specifically, each pixel unit 46 includes a thin film transistor (as a switching element), a pixel electrode and a common electrode. A gate of the thin film transistor is connected with a second gate line to receive a gate signal, a first pole (e.g., source) of the thin film transistor is connected with a second data line to receive a data signal, and a first pole (e.g., drain) of the thin film transistor is connected with a pixel electrode to charge the pixel electrode when it is in an on state. The common electrode and the pixel electrode form a liquid crystal capacitor together with a liquid crystal layer. When the pixel electrode is charged, an electric field is formed between the common electrode and the pixel electrode to control rotation of liquid crystal molecules in the liquid crystal layer. According to whether the display panel is a vertical electric field type or a horizontal electric field type, the common electrode and the pixel electrode may be positioned on a same substrate and disposed adjacent to each other, or positioned on different substrates and facing each other. The display panel also includes a color film for color display.

The drawings of the embodiments of the present disclosure only show part of structures, other structures of the display panel 40, such as a display driving circuit, a color film and a interlayer insulating layer, etc., and other structures of the light control panel 20, such as a light control driving circuit, etc. are not shown, but those skilled in the art may refer to conventional techniques.

The above is only embodiments of the present disclosure, and is not intended to limit the present disclosure. Any modification, equivalent substitution, improvement, etc. made within the spirit and the principle of the present disclosure shall be contained in the protection scope of the present disclosure.

What is claimed is:

1. A display apparatus, comprising a first polarizer, a first liquid crystal panel, a second polarizer, a second liquid crystal panel and a third polarizer which are sequentially stacked, wherein the second polarizer comprises two protective layers, and a polarizing layer positioned between the two protective layers, wherein the first liquid crystal panel is a light control panel, and the second liquid crystal panel is a display panel;

wherein, the display panel comprises a plurality of grid lines extending along a first direction and a second direction crossing each other, and the grid lines define a plurality of sub-pixel units;

the light control panel comprises a plurality of signal lines extending along the first direction and the second direction crossing each other, and the signal lines define a plurality of light control units;

at least part of the signal lines is bent;

wherein, the signal lines comprise a plurality of first signal lines extending along the first direction and a plurality of second signal lines extending along the second direction; the first signal line is bent and comprises a plurality of first bent units arranged periodically and continuously, one of the first bent units corresponds to one of the light control units, and one of the first bent units comprises a first part and a second part, and a first end of the first part is connected with a first end of the second part; and the grid lines comprise a plurality of first grid lines extending along the first direction and a plurality of second grid lines extending along the second direction; an orthographic projection of an intersection of the first signal line and the second signal line on the display panel overlaps with the second grid line; an orthographic projection of a connection point of the first end of the first part and the first end of the second part of one of the first bent units on the display panel overlaps with one of the second grid lines.

2. The display apparatus according to claim 1, wherein the second signal line is bent and comprises a plurality of second bent units arranged periodically and continuously, wherein one of the second bent units corresponds to one of the light control units or one of the second bent units corresponds to two of the light control units; one of the second bent units comprises a first part and a second part, and a first end of the first part of the second bent unit is connected with a first end of the second part of the second bent unit.

3. The display apparatus according to claim 1, wherein a transmission axis of the second polarizer is perpendicular to that of the first polarizer, and a transmission axis of the third polarizer is perpendicular to that of the second polarizer.

4. The display apparatus according to claim 1, wherein a refractive index of the protective layer close to the first liquid crystal panel among the two protective layers of the second polarizer is 1.45~1.60.

5. The display apparatus according to claim 1, wherein a thickness of the protective layer close to the first liquid crystal panel among the two protective layers of the second polarizer is 30 um~80 um.

6. The display apparatus according to claim 1, wherein a material of the protective layer close to the first liquid crystal panel among the two protective layers of the second polarizer is cellulose triacetate.

7. The display apparatus according to claim 1, further comprising a fourth polarizer, wherein the fourth polarizer is positioned between the second polarizer and the first liquid crystal panel, or the fourth polarizer is positioned between the second polarizer and the second liquid crystal panel, and the fourth polarizer has a same structure as the second polarizer.

8. The display apparatus according to claim 7, wherein, an in-plane optical path difference compensation value Ro of the protective layer close to the first liquid crystal panel among the two protective layers of the second polarizer is less than 100 nm, and an optical path difference compensation value Rth in a thickness direction is less than 1000 nm;
an in-plane optical path difference compensation value Ro of the protective layer close to the first liquid crystal panel among the two protective layers of the fourth polarizer is less than 100 nm, and an optical path difference compensation value Rth in a thickness direction is less than 1000 nm.

9. The display apparatus according to claim 8, wherein,
the in-plane optical path difference compensation value Ro of the protective layer close to the first liquid crystal panel among the two protective layers of the second polarizer is less than 50 nm, and the optical path difference compensation value Rth in the thickness direction is less than 500 nm;
the in-plane optical path difference compensation value Ro of the protective layer close to the first liquid crystal panel among the two protective layers of the fourth polarizer is less than 50 nm, and the optical path difference compensation value Rth in the thickness direction is less than 500 nm.

10. The display apparatus according to claim 9, wherein,
the in-plane optical path difference compensation value Ro of the protective layer close to the first liquid crystal panel among the two protective layers of the second polarizer is less than 10 nm, and the optical path difference compensation value Rth in the thickness direction is less than 100 nm;
the in-plane optical path difference compensation value Ro of the protective layer close to the first liquid crystal panel among the two protective layers of the fourth polarizer is less than 10 nm, and the optical path difference compensation value Rth in the thickness direction is less than 100 nm.

11. The display apparatus according to claim 10, wherein,
the in-plane optical path difference compensation values Ro of the two protective layers of the second polarizer are both less than 10 nm, and the optical path difference compensation values Rth in the thickness direction are both less than 100 nm;
the in-plane optical path difference compensation values Ro of the two protective layers of the fourth polarizer are both less than 10 nm, and the optical path difference compensation values Rth in the thickness direction are both less than 100 nm.

12. The display apparatus according to claim 8, wherein a transmission axis of the second polarizer is perpendicular to that of the first polarizer, a transmission axis of the third polarizer is perpendicular to that of the second polarizer, and a transmission axis of the fourth polarizer is parallel to that of the second polarizer.

13. The display apparatus according to claim 1, wherein an in-plane optical path difference compensation value Ro of the protective layer close to the first liquid crystal panel among the two protective layers of the second polarizer is less than 100 nm, and an optical path difference compensation value Rth in a thickness direction is less than 1000 nm.

14. The display apparatus according to claim 13, wherein the in-plane optical path difference compensation value Ro of the protective layer close to the first liquid crystal panel among the two protective layers of the second polarizer is less than 50 nm, and the optical path difference compensation value Rth in the thickness direction is less than 500 nm.

15. The display apparatus according to claim 14, wherein the in-plane optical path difference compensation value Ro of the protective layer close to the first liquid crystal panel among the two protective layers of the second polarizer is less than 10 nm, and the optical path difference compensation value Rth in the thickness direction is less than 100 nm.

16. The display apparatus according to claim 15, wherein the in-plane optical path difference compensation values Ro of the two protective layers of the second polarizer are both less than 10 nm, and the optical path difference compensation values Rth of the two protective layers in the thickness direction are both less than 100 nm.

17. The display apparatus according to claim 16, wherein the first polarizer and the third polarizer both have a same structure as the second polarizer;
wherein, the in-plane optical path difference compensation value Ro of the protective layer close to the first liquid crystal panel among the two protective layers of the first polarizer is less than 10 nm, and the optical path difference compensation value Rth in the thickness direction is less than 100 nm; and/or,
the in-plane optical path difference compensation value Ro of the protective layer close to the second liquid crystal panel among the two protective layers of the third polarizer is less than 10 nm, and the optical path difference compensation value Rth in the thickness direction is less than 100 nm.

18. The display apparatus according to claim 17, wherein,
a material of the protective layer away from the first liquid crystal panel among the two protective layers of the first polarizer is polyethylene terephthalate;
a material of the protective layer away from the second liquid crystal panel among the two protective layers of the third polarizer is polyethylene terephthalate.

* * * * *